United States Patent
Charrat et al.

(10) Patent No.: US 7,665,664 B2
(45) Date of Patent: Feb. 23, 2010

(54) INDUCTIVE COUPLING READER COMPRISING MEANS FOR EXTRACTING A POWER SUPPLY VOLTAGE

(75) Inventors: Bruno Charrat, Aix en Provence (FR); Michael Martin, Rognes (FR); Olivier Carron, Roquevaire (FR)

(73) Assignee: Inside Contactless, Aix en Provence Cedex (FR)

( * ) Notice: Subject to any disclaimer, the term of this patent is extended or adjusted under 35 U.S.C. 154(b) by 766 days.

(21) Appl. No.: 11/302,291

(22) Filed: Dec. 13, 2005

(65) Prior Publication Data

US 2007/0045418 A1   Mar. 1, 2007

(30) Foreign Application Priority Data

Aug. 23, 2005   (FR)   ................................. 05 08694

(51) Int. Cl.
*G06K 7/08* (2006.01)
*G06K 19/06* (2006.01)

(52) U.S. Cl. .................. 235/451; 235/492; 235/493
(58) Field of Classification Search ............... 235/380, 235/451, 492, 493; 340/10.1, 10.4; 343/822, 343/913; 327/110

See application file for complete search history.

(56) References Cited

U.S. PATENT DOCUMENTS

| 5,874,725 | A | * | 2/1999 | Yamaguchi | ................. 235/492 |
| 6,158,656 | A | * | 12/2000 | Matsumoto et al. | ......... 235/380 |
| 6,540,147 | B2 | * | 4/2003 | Charrat | ....................... 235/492 |
| 7,064,716 | B2 | * | 6/2006 | Deguchi et al. | ............ 343/702 |
| 2003/0169152 | A1 | * | 9/2003 | Charrat et al. | ............. 340/10.1 |

FOREIGN PATENT DOCUMENTS

| GB | 2 406 023 A | 3/2005 |
| WO | 2005057481 A1 | 6/2005 |

* cited by examiner

*Primary Examiner*—Thien M. Le
*Assistant Examiner*—Sonji Johnson
(74) *Attorney, Agent, or Firm*—Panitch Schwarze Belisario & Nadel LLP (57) ABSTRACT

The present invention relates to a method for supplying a power supply voltage (Vccr) to a contactless integrated circuit reader (RD1) that is in a passive operating mode, in the presence of an external alternating magnetic field (FLD2), the reader comprising an antenna circuit (ACT) substantially tuned to a working frequency (F0). According to the present invention, the method comprises the steps of taking off in the antenna circuit (ACT) an alternating voltage (Vcd) induced in the antenna circuit by the external magnetic field (FLD2), and rectifying the induced voltage to supply an auxiliary supply voltage (Vccr).

30 Claims, 7 Drawing Sheets

INDUCTIVE COUPLING READER COMPRISING MEANS FOR EXTRACTING A POWER SUPPLY VOLTAGE

The present invention relates to an inductive coupling reader provided for reading contactless integrated circuits of PICC type (Proximity Inductive Coupling Circuit). In the present state of technology, such a reader has various names, particularly "PCD" (Proximity Coupling Device) according to the ISO/IEC standard 14443, "VCD" (Vicinity Coupling Device) according to the ISO/IEC standard 15693, "inductive coupler" in technical documents, etc.

The present invention relates more particularly to a reader capable of exchanging data with another reader, in addition to exchanging data with a contactless integrated circuit.

Methods of transmitting data between inductive coupling readers are currently arousing considerable interest in that they offer various prospects of application and can compete with or complete classical wireless data transmission techniques such as Bluetooth®.

Such methods have been named "NFC" (Near Field Communication) by the industrial community, and have a specially dedicated industrial forum (www.nfc-forum.org/home).

Inductive coupling readers embedded in mobile telephones or PDAs (personal digital assistants) are particularly concerned by NFC methods, so that data can be transferred between two mobile telephones, between a mobile telephone and a PDA or vice-versa, or between a telephone or a PDA and a reader linked to a PC via a USB interface.

However, in such applications, it is essential to use readers which consume little electricity because an embedded reader uses the energy supplied by the battery of the mobile telephone or the PDA and this battery must be saved as much as possible.

European patent EP 1,327,222 in the name of the applicant describes a method for transmitting data between two readers in which one of the two readers is in a passive mode and consumes little electrical energy. This method, named eNFC ("enhanced NFC"), enables data to be transferred between a reader in passive mode and a reader in active mode or vice-versa. The reader in active mode emits a magnetic field oscillating at a working frequency F0, such as 13.56 MHz for example, whereas the reader in passive mode does not, in principle, emit any magnetic field (except for the exception described below, in which bursts of a carrier signal are sent).

Figure 1A:
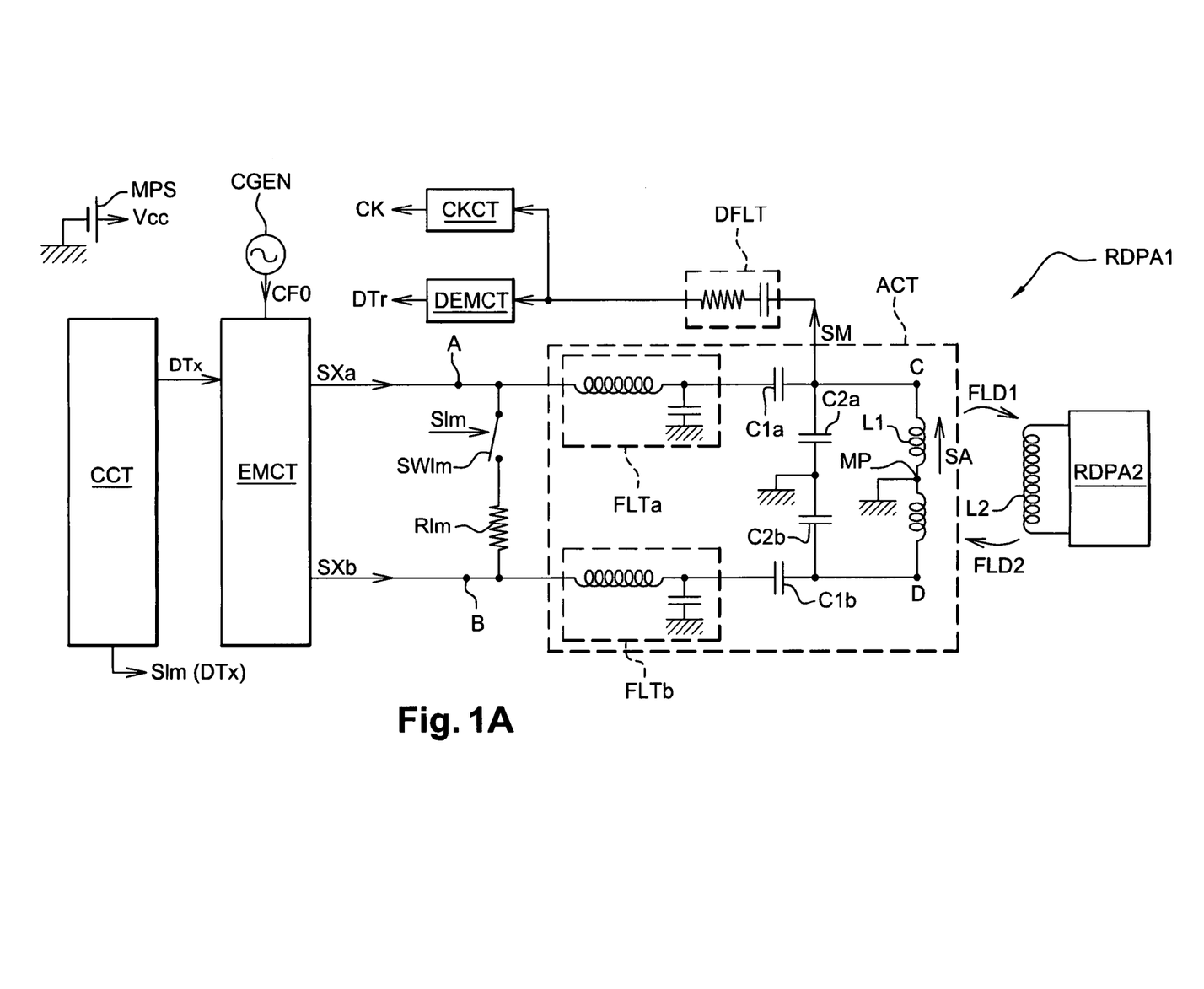
FIG. 1A represents the architecture of a classical inductive coupling reader.

A classical architecture of a reader RDPA1 with two operating modes, active and passive, is represented in FIG. 1A. The reader RDPA1 comprises the following elements:
  a control circuit CCT,
  an antenna circuit ACT comprising two input terminals A, B, capacitors C1a, C1b, C2a, C2b and an antenna coil L1 having two terminals C, D,
  two low-pass filters FLTa, FLTb of EMC type (EMC=electromagnetic compatibility) incorporated into the antenna circuit ACT,
  an emitter circuit EMCT linked to the terminals A, B of the antenna circuit,
  a demodulation circuit DEMCT and a clock extraction circuit CKCT linked to the antenna circuit through a band-pass filter DFLT, and
  a load modulation simulation circuit linked to the terminals A, B of the antenna circuit ACT, comprising a switch SW1$m$ in series with a load resistor R1$m$,
  an oscillator CGEN supplying to the circuit EMCT a carrier signal CF0 or "carrier" CF0, of frequency F0 (working frequency of the reader, generally 13.56 MHz), and
  a main supply source MPS supplying a voltage Vcc that powers the various devices of the reader, such as a battery or a transformer connected to the electrical network for example.

The antenna circuit ACT is of symmetrical type and has the following structure:
  the antenna coil L1 has a midpoint MP linked to the ground,
  one terminal of the capacitor C1a is connected to the terminal C of the antenna coil L1 and the other terminal of the capacitor is linked to the terminal A of the antenna circuit via the filter FLTa,
  one terminal of the capacitor C1b is connected to the terminal D of the antenna coil L1 and the other terminal of the capacitor is linked to the terminal B of the antenna circuit via the filter FLTb,
  one terminal of the capacitor C2a is connected to the terminal C of the antenna coil L1 and the other terminal of the capacitor is linked to the ground of the reader,
  one terminal of the capacitor C2b is connected to the terminal D of the antenna coil L1 and the other terminal of the capacitor is linked to the ground.

The change from the active operating mode to the passive operating mode, or vice-versa, is controlled by the circuit CCT, by means of a flag present in a state register (not represented) for example. A brief reminder of the characteristics of these two operating modes will be given, each mode comprising phases of sending data and phases of receiving data.

Active Operating Mode

The circuit CCT activates the oscillator CGEN and the emitter circuit EMCT. The circuit EMCT applies to the antenna circuit ACT a control signal SX comprising the carrier CFO supplied by the oscillator CGEN. The signal SX is here split into two components SXa, SXb in opposite phase due to the symmetrical structure of the antenna circuit. An alternating antenna signal SA appears at the terminals of the antenna coil L1 and the latter emits a magnetic field FLD1 oscillating at the frequency F0.

Data Sending in Active Mode

Sending data in active mode enables the reader RDPA1 to send data DTx to a passive contactless integrated circuit or to a reader RDPA2 (represented in FIG. 1A) that is in the passive mode. To this end, the circuit CCT applies the data DTx to the circuit EMCT and the latter modulates the amplitude of the signal SX according to these data. The amplitude modulation is communicated to the antenna signal SA and to the magnetic field FLD1 emitted and is detected by the reader RDPA2.

Data Receiving in Active Mode

Receiving data in active mode enables the reader RDPA1 to receive data DTr sent by load modulation by a contactless integrated circuit or by the reader RDPA2 in passive mode. To this end, the reader RDPA2 modulates the impedance of its antenna circuit to simulate a load modulation that would be done by a contactless integrated circuit. The load modulation affects the antenna circuit ACT of the reader RDPA1 and a load modulation signal SM appears in the antenna coil L1, in the form of a modulation of the envelope of the antenna signal SA. The signal SM is extracted from the antenna signal SA by the band-pass filter DFLT and is demodulated by the circuit DEMCT, which supplies the data received DTr to the circuit CCT.

Passive Operating Mode

The circuit CCT deactivates the emitter circuit EMCT and the oscillator CGEN. The reader RDPA2 is put into the active mode such that the antenna coil L2 of this reader emits a magnetic field FLD2. The magnetic field FLD2 causes an antenna signal SA to appear in the antenna coil L1 of the reader RDPA1. This antenna signal is designated for the sake of simplicity by the same reference as the antenna signal of the active mode, although it appears here by inductive coupling between the antenna coils L1 and L2. The clock signal CK of the reader is extracted from the antenna signal SA by the circuit CKCT (operating mode said to be "totally passive") or is supplied by an autonomous oscillator (not represented) powered by a local voltage source (operating mode said to be "passive").

Data Receiving in Passive Mode

Receiving data in passive mode enables the reader RDPA1 to receive data DTr that the reader RDPA2 sends by modulating the amplitude of the magnetic field FLD2. This amplitude modulation forms, as in the case of receiving data in active mode, a modulation signal SM of the antenna signal SA envelope. The signal SM is extracted from the antenna signal SA by the circuit DEMCT, the latter enabling both the load modulation signal SM received in active mode and the amplitude modulation signal SM received in passive mode to be extracted, the extraction involving in both cases a demodulation of the envelope of the antenna signal.

Data Sending in Passive Mode

Sending data in passive mode enables the reader RDPA1 to send data DTx to the reader RDPA2. To this end, the circuit CCT applies a load modulation control signal S1m comprising the data DTx to the switch SW1m. To simulate a load modulation that would be done by a contactless integrated circuit, the signal S1m is modulated according to the standards applicable to contactless integrated circuits, for example with a sub-carrier the frequency of which is a sub-multiple of the working frequency F0 (typically 847 KHz or 424 KHz). The sub-carrier is supplied by frequency dividing circuits provided in the circuit CCT, using the clock signal CK.

Such an inductive coupling reader has the advantage of being able to exchange data with other readers in passive mode, without emitting any magnetic field and consequently consuming little energy.

Thus, although the reader RDPA1 must be put into the active mode when it exchanges data with a contactless integrated circuit (during the reading of an electronic business card for example), it is preferably put into the passive mode when it must transfer data to the reader RDPA2 if the latter's electrical energy is not limited (when the reader RDPA2 is a reader linked to a desktop computer and is electrically powered thereby for example), the reader RDPA2 then being put into the active mode.

Although the electrical consumption of such a reader in passive mode is low, it nonetheless restricts the length of use of a mobile telephone or PDA battery.

To overcome this disadvantage, the present invention provides a reader that is capable, in passive operating mode, of receiving by inductive coupling a portion of the energy emitted by the reader in active mode with which it exchanges data.

A coil dedicated to receiving energy can be provided for that purpose. However, adding a dedicated antenna coil in a reader is a costly solution and its incorporation into a mobile telephone or a PDA causes various technical problems.

Thus, the present invention provides for extracting electrical energy directly from the antenna circuit of the reader, without using a dedicated antenna coil.

More particularly, the present invention provides a method for supplying a power supply voltage to a contactless integrated circuit reader that is in a passive operating mode, in the presence of an external alternating magnetic field, the reader comprising an antenna circuit comprising at least one input terminal, at least one capacitor and an antenna coil having two end terminals, the antenna circuit being substantially tuned to a working frequency and having, seen from its input terminal and at the working frequency, a first impedance, the method comprising a step of taking off in the antenna circuit an alternating voltage induced in the antenna circuit by the external magnetic field, and a step of rectifying the alternating voltage to supply an auxiliary supply voltage.

According to one embodiment, the method comprises the steps of applying to the input terminal of the antenna circuit a control signal having an electric potential by default such that the antenna circuit has a higher impedance point at which its impedance is higher than the first impedance, and taking off the alternating voltage at the higher impedance point without going through the input terminal.

According to one embodiment, the alternating voltage is taken off on at least one terminal of the antenna coil.

According to one embodiment, the alternating voltage is rectified without clipping the induced alternating voltage.

According to one embodiment, the alternating voltage is taken off on one of the end terminals of the coil.

According to one embodiment, the alternating voltage is taken off on one terminal of the antenna coil that is not at the end of the coil and which forms a dividing point of the induced alternating voltage.

According to one embodiment, the auxiliary supply voltage is supplied during a data receiving phase of the reader in passive operating mode.

According to one embodiment, the auxiliary supply voltage is also supplied during a data sending phase of the reader in passive operating mode.

According to one embodiment, the method is applied to a reader comprising an internal power supply line linked to a main power supply source, supplying a main supply voltage, and comprising injecting the auxiliary supply voltage into the internal supply line and blocking the main supply voltage when the auxiliary supply voltage is injected into the internal supply line.

According to one embodiment, the default electric potential of the control signal is the high impedance potential, or the 0 potential, corresponding to the ground potential of the reader.

According to one embodiment, the method comprises a step of switching the control signal into a second electric potential in addition to the default electric potential, so as to cause a modification to the impedance of the antenna circuit, to cause a load modulation in the antenna coil of another reader and to send data in passive mode by means of the antenna circuit.

According to one embodiment, the control signal in passive mode has one of the following combinations of states: 1) by default, the 0 potential, and the high impedance potential to simulate a load modulation; 2) by default, the high impedance potential, and the 0 potential to simulate a load modulation; 3) by default, the 0 potential, and a direct voltage to simulate a load modulation; 4) by default, the high impedance potential, and a direct voltage to simulate a load modulation; 5) by default, the 0 potential, and an oscillating electric signal to simulate a load modulation; 6) by default, the high impedance potential and an oscillating electric signal to simulate a load modulation.

The present invention also relates to an inductive coupling reader having an active operating mode and a passive operating mode and comprising: an antenna circuit substantially tuned to a working frequency, comprising at least one input terminal, at least one capacitor, and an antenna coil having two end terminals, the capacitor and the coil being chosen so that the antenna circuit is substantially tuned to a working frequency and has, at the working frequency and seen from its input terminal, a first impedance; an emitter circuit for applying to the input terminal of the antenna circuit, when the reader is in the active operating mode, an excitation signal oscillating at the working frequency, so that the antenna coil emits a magnetic field, and for modulating the excitation signal to send data; an auxiliary supply circuit linked to the antenna circuit and arranged for supplying an auxiliary supply voltage of the reader using an alternating voltage induced in the antenna circuit by an external magnetic field.

According to one embodiment, the reader comprises a circuit for applying to the input terminal of the antenna circuit, in the passive operating mode, a control signal having an electric potential by default such that the antenna circuit has a higher impedance point at which its impedance is higher than the first impedance, and the auxiliary supply circuit is linked to the higher impedance point without going through the input terminal of the antenna circuit.

According to one embodiment, the auxiliary supply circuit is linked to at least one terminal of the antenna coil.

According to one embodiment, the auxiliary supply circuit comprises an input stage without a clipper diode for clipping the induced alternating voltage.

According to one embodiment, the auxiliary supply circuit is connected to one of the end terminals of the coil.

According to one embodiment, the auxiliary supply circuit is connected to one terminal of the coil that is not at the end of the coil and which forms a dividing point of the induced alternating voltage.

According to one embodiment, the auxiliary supply circuit comprises at least one rectifying diode for rectifying the alternating voltage and a capacitor for low-pass filtering the rectified voltage.

According to one embodiment, the auxiliary supply circuit supplies the auxiliary supply voltage during a phase of receiving data in passive operating mode.

According to one embodiment, the auxiliary supply circuit also supplies the auxiliary supply voltage during a phase of sending data in passive operating mode.

According to one embodiment, the reader comprises an internal power supply line linked firstly to a main power supply source and secondly to the auxiliary supply circuit.

According to one embodiment, the internal supply line is linked to the main supply source and to the auxiliary supply circuit through a circuit that blocks a voltage proceeding from the main supply source when the auxiliary supply voltage is present.

According to one embodiment, the default electric potential of the control signal is the high impedance potential or the 0 potential, corresponding to the ground potential of the reader.

According to one embodiment, the reader comprises a circuit for taking the control signal into a second electric potential in addition to the default electric potential, in order to cause a modification to the impedance of the antenna circuit at the working frequency and to send data in passive operating mode.

According to one embodiment, the control signal in passive mode has one of the following combinations of states: 1) by default, the 0 potential, and the high impedance potential to simulate a load modulation; 2) by default, the high impedance potential, and the 0 potential to simulate a load modulation; 3) by default, the 0 potential, and a direct voltage to simulate a load modulation; 4) by default, the high impedance potential, and a direct voltage to simulate a load modulation; 5) by default, the 0 potential, and an oscillating electric signal to simulate a load modulation; 6) by default, the high impedance potential and an oscillating electric signal to simulate a load modulation.

According to one embodiment, the emitter circuit supplies the control signal applied to the input terminal of the antenna circuit in the passive operating mode.

According to one embodiment, the control signal is taken to the second electric potential by the emitter circuit.

The present invention also relates to a portable electronic device comprising means for processing data and a rechargeable battery, particularly a mobile telephone or a personal digital assistant, comprising a reader according to the present invention.

According to one embodiment of the portable electronic device, the reader in the active operating mode is powered by the battery of the portable device, and is self-powered by the auxiliary supply circuit in the passive operating mode.

These and other objects, features and advantages of the present invention will be explained in greater detail in the following description of the method according to the present invention and of an example of embodiment of an inductive coupling reader according to the present invention, given in relation with, but not limited to the following figures.

According to a first aspect of the present invention, electrical energy is directly extracted from the antenna circuit of an inductive coupling reader, without equipping the reader with an additional coil.

Figure 1B:
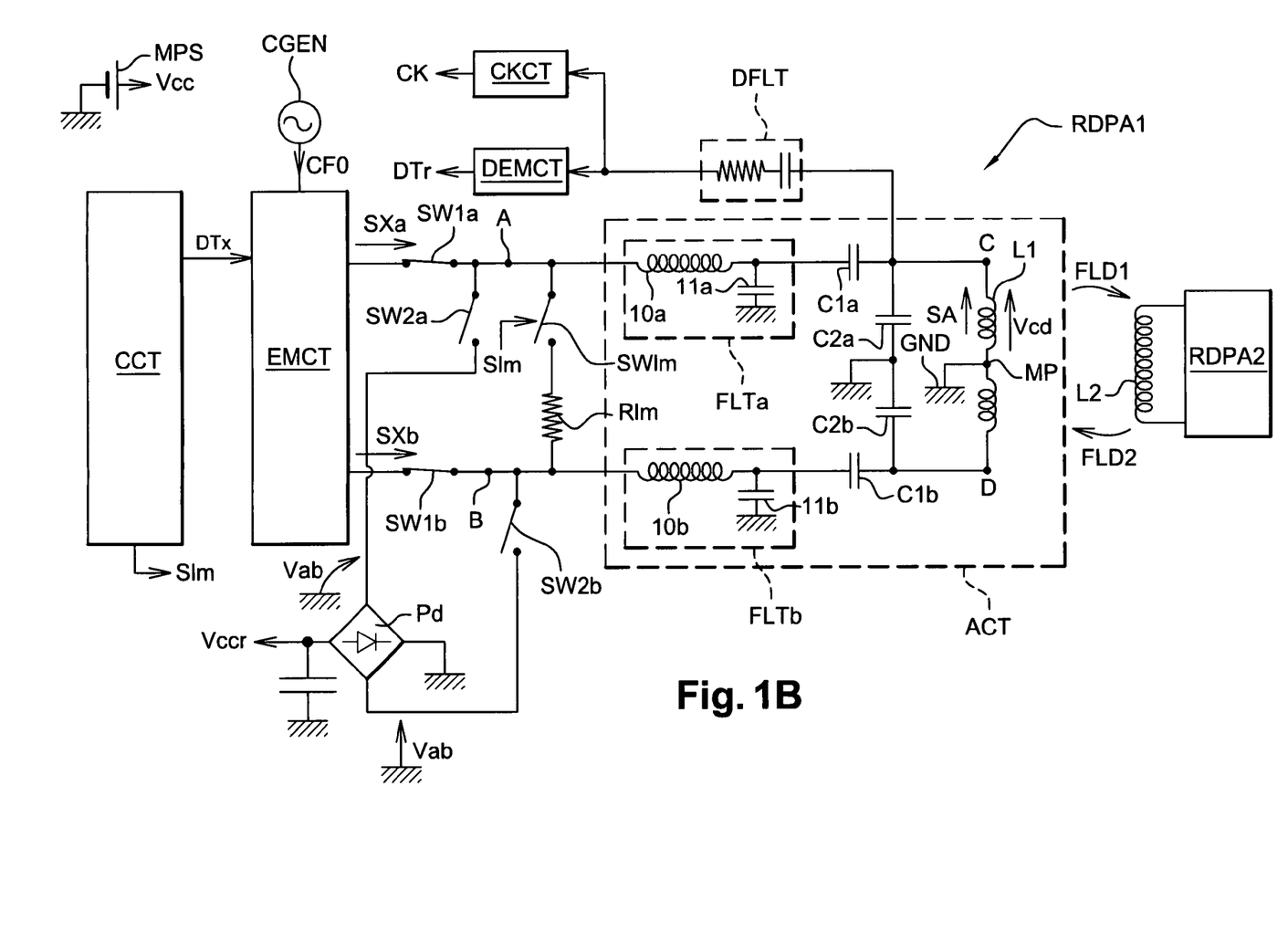
FIG. 1B represents the reader in FIG. 1A equipped with a means for receiving electrical energy by inductive coupling.

FIG. 1B shows the implementation of this aspect of the present invention in the reader RDPA1 described above in relation with FIG. 1A. The general structure of the reader RDPA1 remains unchanged, and the same elements are designated by the same references.

The antenna circuit ACT comprises, between its input terminals A, B, the coil L1 the midpoint MP of which is linked to the ground GND, the capacitors C1$a$, C1$b$, C2$a$, C2$b$ and the filters FLTa, FLTb. The filter FLTa comprises for example a coil 10$a$ connected between the terminal A and the capacitor C1$a$, and a capacitor 11$a$ connected between the capacitor C1$a$ and the ground. The filter FLTb is identical to the filter FLTa and comprises a coil 10$b$ connected between the terminal B and the capacitor C1$b$, and a capacitor 11$b$ connected between the capacitor C1$b$ and the ground.

The antenna circuit ACT is classically a resonant circuit set substantially to the working frequency F0, "substantially"

meaning to within a few hundred KHz, for example with a difference in the order of 0 to Fsc relative to the frequency F0, Fsc being the frequency of a sub-carrier used for the load modulation, such as 847 KHz for example. Providing such a difference is within the know-how of those skilled in the art and is aimed solely at optimising the receipt of the sub-carrier in active mode.

According to the present invention, the following elements are added to the reader RDPA1:

two switches SW1a, SW1b between the outputs of the emitter circuit EMCT and the terminals A, B of the antenna circuit, a diode rectifier bridge Pd comprising a smoothing capacitor Cs at output, and two switches SW2a, SW2b linking the inputs of the rectifier bridge to the terminals A, B of the antenna circuit.

Thus, when the reader RDPA1 is in the active operating mode, the control circuit CCT closes the switches SW1a, SW1b and opens the switches SW2a, SW2b. The circuit EMCT is linked to the terminals A, B of the antenna circuit ACT and applies to the latter the control signal SX comprising the carrier CF0 of frequency F0, and split into two components SXa, SXb.

In the passive operating mode, the circuit CCT deactivates the circuit EMCT and the oscillator CGEN, opens the switches SW1a, SW1b and closes the switches SW2a, SW2b. Thus, the rectifier Pd is connected to the terminals A, B of the antenna circuit. In the presence of a magnetic field FLD2 emitted by another reader RDPA2, the rectifier Pd receives an alternating voltage Vab that varies, on the one hand, according to the voltage Vcd of the antenna signal SA induced in the coil L1, i.e. the voltage appearing between the terminal C of the coil L1 and the midpoint MP (this voltage also appearing between the terminal D of the coil and the midpoint MP) and, on the other hand, according to the impedance of the antenna circuit seen from the terminals A, B. The rectifier Pd then supplies an auxiliary supply voltage Vccr, by rectifying the voltage Vab.

The clock signal CK of the reader is extracted from the antenna signal SA by the circuit CKCT or is supplied by an autonomous oscillator (not represented) that could be powered by the voltage Vccr.

Although this mode of receiving electrical energy by inductive coupling meets the intended aim of the present invention in principle, is does have a disadvantage. Indeed, the antenna circuit ACT is generally provided to have a high quality factor and low impedance at the working frequency F0, generally only a few tens of ohms, so that the magnetic field FLD1 emitted in active mode has a maximum amplitude in response to the control signal SX supplied by the circuit EMCT. Now, such low value of the antenna circuit impedance is contrary to the electrical energy being properly received since such energy is partly consumed in the antenna circuit, such that the current which can be supplied by the auxiliary supply circuit is low.

In these conditions, the auxiliary voltage Vccr cannot be used to directly power the reader RDPA1. It can only be used to partially recharge the main power supply source MPS if this is a battery, or to slowly charge up a backup battery.

Those skilled in the art will understand that it is not possible to consider solving this disadvantage by giving the antenna circuit high impedance at the working frequency F0, because the primary function of the reader is to read passive contactless integrated circuits and priority must be given to optimising its operation in active mode.

Thus, the present invention also aims to provide a method whereby electrical energy can be extracted from the antenna circuit with a good yield without the need to modify the impedance of the antenna circuit at the working frequency.

To this end, the present invention is first of all based on a finding disclosed by European patent EP 1,327,222 (above-mentioned), whereby a reader in passive mode can send data to another reader by applying a control signal with two states to the input terminals A, B of its antenna circuit. Such a signal with two states makes it possible to simulate a load modulation that would be done by a contactless integrated circuit. According to European patent EP 1,327,222, the states that can be applied to the terminals A, B of the antenna circuit are for example the following:

0 (ground of the reader),

HZ (high impedance),

"1", i.e. a direct voltage Vcc, or a burst of the carrier CF0.

The present invention is subsequently based on the observation that some of these states, particularly the 0 and HZ electric potentials, cause an increase in the impedance of the antenna circuit at certain points of the antenna circuit, particularly on the terminals C, D of the antenna coil.

Thus, as a higher impedance guarantees a better receipt of the electrical energy by inductive coupling, the present invention provides for:

1) applying one of these states or electric potentials to the terminals A, B of the antenna circuit, and 2) producing the auxiliary supply voltage Vccr using an alternating voltage taken off at a higher impedance point of the antenna circuit, preferably using the voltage Vcd taken off on the terminals C and/or D of the antenna coil L1, instead of producing the voltage Vccr using the voltage Vab present on the terminals A, B of the antenna circuit.

The method according to the present invention thus comprises the following operations:

when the reader RD1 is in passive mode and is awaiting data or is receiving data, applying to the terminals A, B of the antenna circuit the default state that is defined as being the best electric potential for properly receiving the energy, such as the 0 or HZ potential for example, when the reader is sending data in passive mode, changing from the default state to another state so as to simulate a load modulation.

The state enabling a load modulation to be simulated is preferably the HZ electric potential if the 0 electric potential is the default state or the 0 electric potential if the HZ electric potential is the default state.

The state "1" or electric potential Vcc can also be used to simulate a load modulation, in combination with the default state 0 or HZ, by providing short pulses of voltage Vcc. Thus, if the load modulation simulation is paced by a sub-carrier of 847 KHz, the duration of the load modulation simulation pulses is equal to $R*1/847*10^3$ ms, R being the duty factor of the pulses, i.e. 0.59 ms if the pulses have a duty factor equal to 0.5, and 0.3 ms if these pulses have a duty factor equal to 0.25.

Equally, the present invention does not rule out using the state called "carrier bursts" to simulate a load modulation, in combination with the 0 or HZ potential as default state, provided the reader is equipped with a high-value smoothing capacitor capable of compensating for an alteration in the receipt of the energy during the periods in which carrier bursts are sent (this point will be discussed below).

In summary, the possible combinations of states are the following (the first state designated in each combination being the default state):

combination 1: {0, HZ}, combination 2: {HZ, 0}, combination 3: {0, 1},
combination 4: {Hz, 1},
combination 5: {0, "bursts of the carrier CF0"},
combination 6: {HZ, "bursts of the carrier CF0"}

Figure 2A:
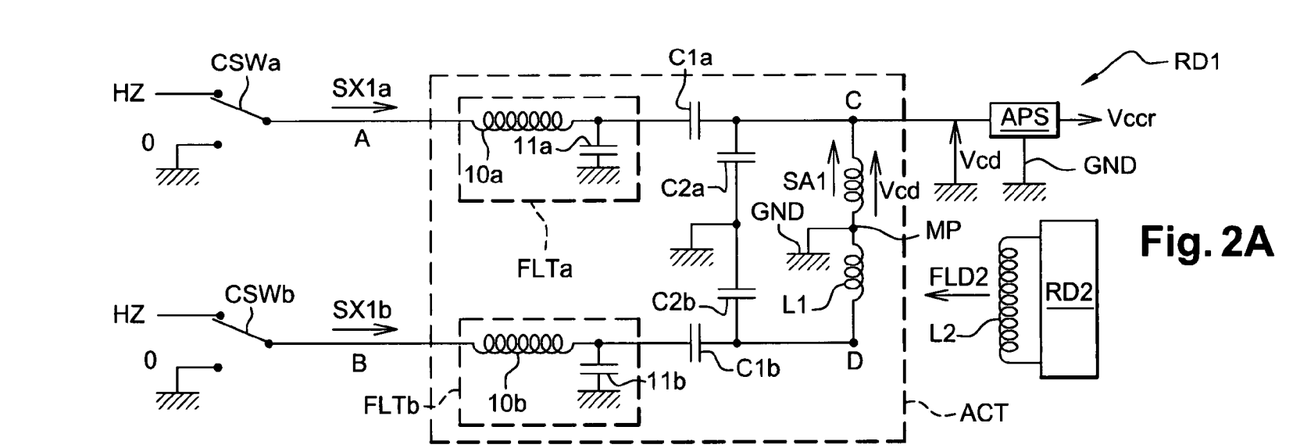
FIGS. 2A, 2B, 2C show a method according to the present invention enabling a reader to receive electrical energy by inductive coupling while receiving or sending data, the method here being applied to a symmetrical antenna circuit.
Figure 2B:
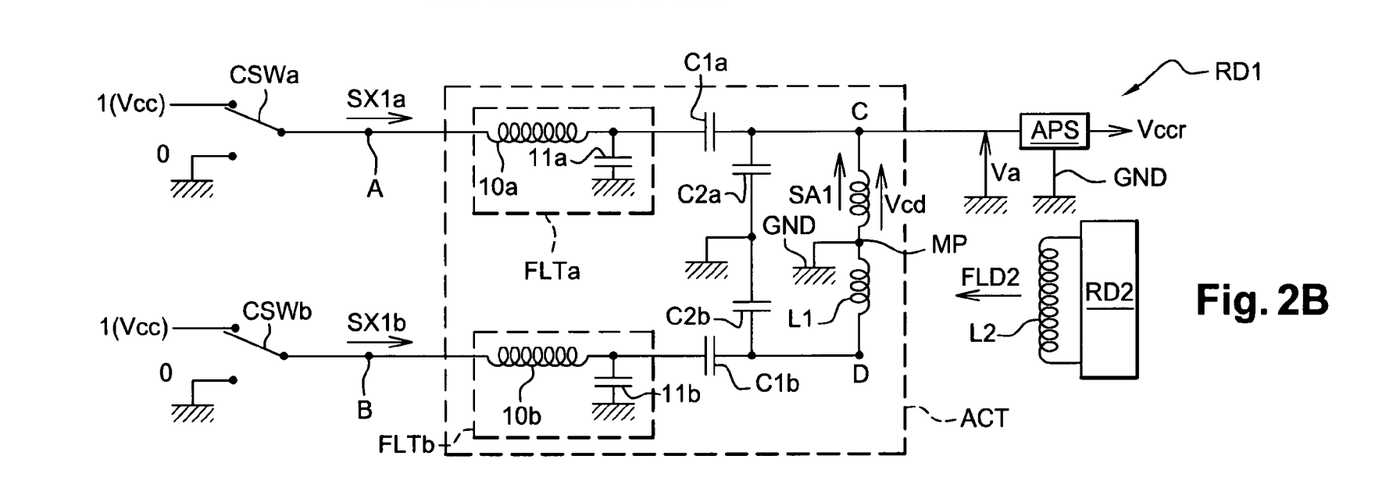
Figure 2C:
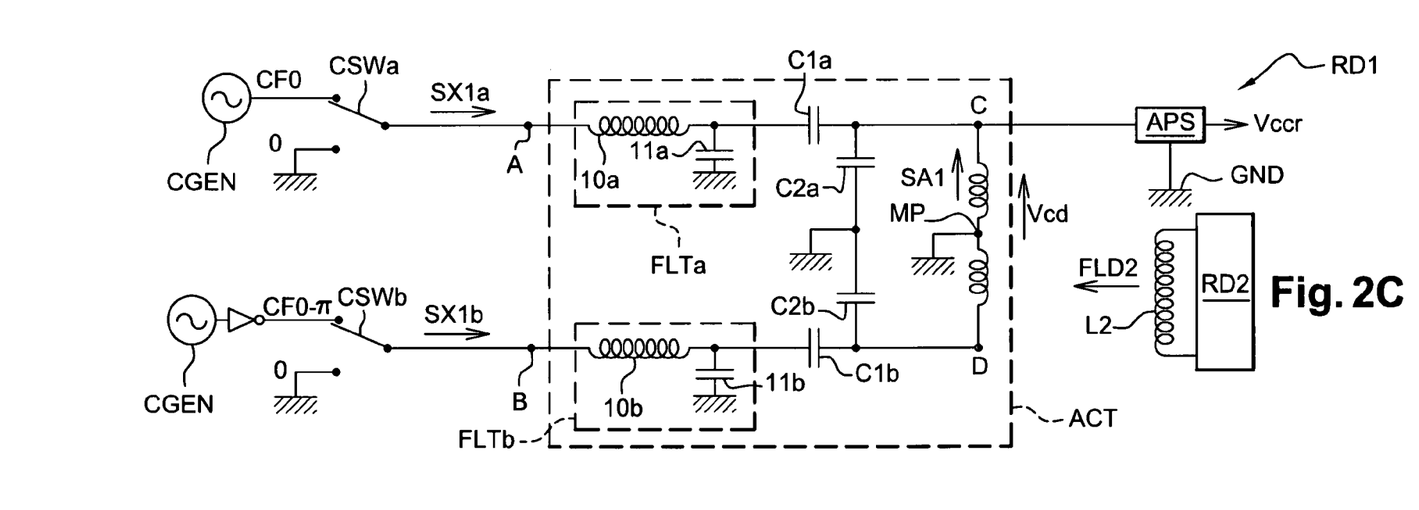

FIGS. 2A, 2B, 2C show the implementation of the combinations 1, 3 and 5, respectively. These figures represent the antenna circuit ACT already described and an auxiliary supply circuit APS according to the present invention. It is assumed here that the antenna circuit ACT and the auxiliary supply circuit APS are elements of a reader RD1 powered by the voltage Vcc, the other elements of which are not represented and will be described below in relation with FIG. 6.

The auxiliary supply circuit APS comprises a first input connected to one of the terminals C, D of the antenna coil L1, here the terminal C, and a second input connected to the ground GND. The terminals A, B of the antenna circuit receive a control signal SX1 according to the present invention, which here comprises two components SX1a, SX1b. The switching of the components SX1a, SX1b from one state to the other is outlined by two switches CSWa, CSWb each having one output and two inputs: the first and second inputs of each switch CSWa, CSWb receive one of the two states or electric potentials of the control signal SX1, while the output of the switch CSWa is connected to the terminal A of the antenna circuit and the output of the switch CSWb is connected to the terminal B of the antenna circuit ACT.

In the presence of an external magnetic field FLD2 emitted by the antenna coil L2 of a reader RD2, an alternating antenna signal SA1 of voltage Vcd appears in the coil L1 by inductive coupling, between the terminal C of the antenna coil L1 and the midpoint MP or ground GND (and between the terminal D and the midpoint). Thus, the input of the circuit APS receives the voltage Vcd and supplies the auxiliary supply voltage Vccr by rectifying the voltage Vcd.

In the example of an embodiment shown in FIG. 2A, the first input of each switch CSWa, CSWb receives the 0 potential (inputs connected to the ground) and the second input of each switch CSWa, CSWb receives the HZ potential (inputs in open circuit), such that the control signal SX1 changes from the default 0 electric potential to the HZ electric potential when a load modulation simulation pulse must be sent to the reader RD2.

Figure 3A:
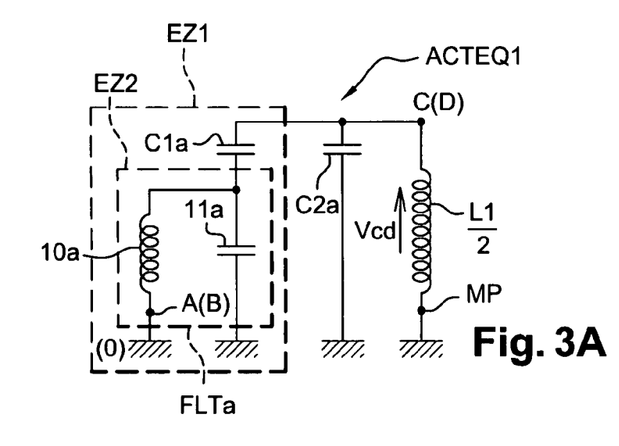
FIGS. 3A, 3B are equivalent diagrams of the antenna circuit in configurations shown in FIGS. 2A to 2C.

When the signal SX1 is on 0 (SX1a=SX1b=0) the terminals A and B are connected to the ground. The equivalent diagram ACTEQ1 of the antenna circuit in this configuration is represented in FIG. 3A. This equivalent diagram is the diagram of the non-symmetrical semi-antenna circuit comprising only half of the antenna coil L1 (designated "L1/2", i.e. the portion of the coil extending between the node C and the midpoint MP), the capacitors C1a, C2a, and the filter FLTa comprising the coil 10a and the capacitor 11a.

Figure 3B:
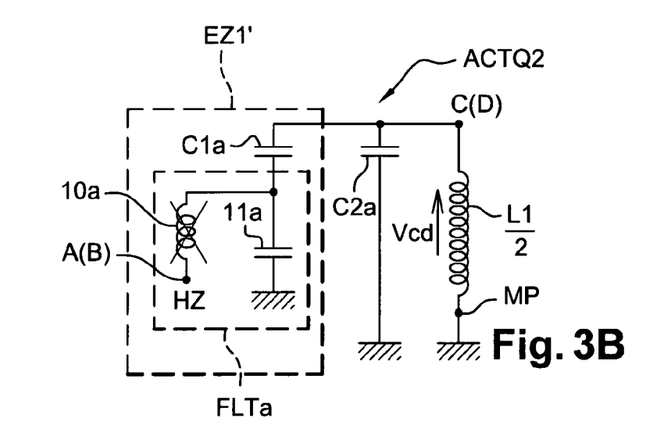

When the signal SX1 is in the state HZ (SX1a=SX1b=HZ) the terminals A and B are in open circuit. The equivalent diagram ACTEQ2 of the antenna circuit is represented in FIG. 3B. As the previous one, this equivalent diagram is the diagram of the equivalent non-symmetrical semi-antenna circuit.

As it will be understood by those skilled in the art, the antenna circuit in one or other of the configurations ACTEQ1 or ACTEQ2 has, at the working frequency F0, a higher impedance than the impedance that the same antenna circuit has seen from the terminals A or B. Indeed, the antenna circuit seen from the terminals A or B is a serial/parallel circuit LC whereas the antenna circuit seen from the terminal C or D is a parallel circuit LC in the configurations ACTEQ1, ACTEQ2. More particularly:

1) in the configuration ACTEQ1 the coil L1 is in parallel with the capacitor C2a and is also in parallel with an impedance EZ1. This impedance EZ1 is formed by the capacitor C1a in series with an impedance EZ2. The impedance EZ2 is formed by the capacitor 11a of the filter FLTa in parallel with the coil 10a of the filter FLTa (because the end of the coil 10a is connected to the terminal A of the antenna circuit, which is connected to the ground).

2) in the configuration ACTEQ2, the coil L1 is in parallel with the capacitor C2a and with an impedance EZ1'. This impedance EZ1' is formed by the capacitor C1a in series with the capacitor 11a of the filter FLTa (as the end of the coil 10a connected to the terminal A is in open circuit, the coil 10a is not taken into account).

Of these two configurations, the one that has the highest impedance depends on the values given to the components L1, C1a, C1b, C2a, C2b, 10a, 11a, 10b, 11b. These values can be chosen at the time of designing the antenna circuit using software calculation and simulation tools, to determine in advance the configuration of the highest impedance. However, out of a set of possible values of the values of the components L1, C1a, C1b, C2a, C2b, FLTa, FLTb, it emerges that the configuration ACTEQ1 generally has a higher impedance than the configuration ACTEQ2, such that, against all expectations, the state 0 is the preferred default state of the control signal SX1 in passive mode.

These observations also apply to the example of an embodiment shown in FIG. 2B, in which the default state of the signal SX1 is the 0 potential and the state enabling a load modulation to be simulated is the direct voltage Vcc. Thus, the electrical energy is optimally received when the reader receives or is waiting to receive data. When the direct voltage Vcc is applied to the antenna circuit, this voltage is superimposed on the induced alternating voltage Vcd but does not prevent the electrical energy from being received.

In the example of an embodiment shown in FIG. 2C, the switches CSWa, CSWb receive at their first input the 0 potential (default potential) and receive at their second input the carrier CF0, the latter being applied to the switch CSWa without phase shift and to the switch CSWb with a phase shift of 180° (F0−π) so that the signals SX1a, SX1b do not cancel each other out. As the load modulation simulation is generally done with the sub-carrier Fsc the frequency of which is a sub-multiple of the carrier F0, each burst of the carrier CFO forming a load modulation pulse is longer than the period of the carrier (1/F0) and thus comprises several oscillations of the carrier CF0. For example, a carrier of frequency F0=13.56 MHz has a period of 0.0737 ms whereas a carrier burst F0 has a duration of 0.59 ms or 0.3 ms in accordance with the calculation done above concerning the duration of the load modulation pulses.

Figures 4, 5A, 5B, 5C:
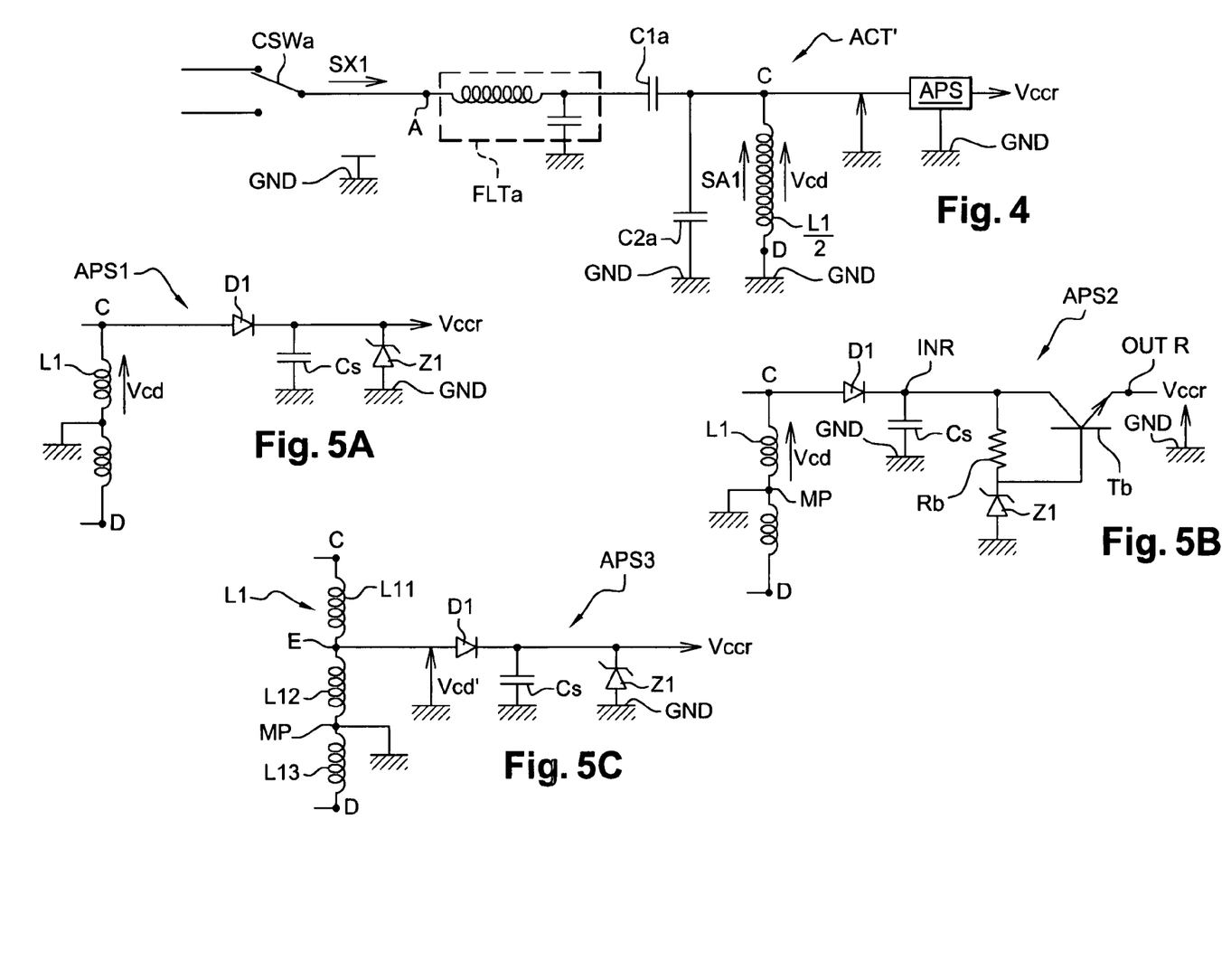
FIG. 4 shows the same method applied to a non-symmetrical antenna circuit.
FIGS. 5A, 5B, 5C represent various embodiments of an auxiliary supply circuit according to the present invention.

The method of the present invention is also applicable to a non-symmetrical antenna circuit without midpoint such as the antenna circuit ACT' represented in FIG. 4. The antenna circuit ACT' is equivalent to a symmetrical semi-antenna circuit ACT and only comprises the input terminal A, the filter FLTa, the capacitors C1a, C2a and the semi-antenna coil L1/2 the terminal D of which is connected to the ground GND. The capacitor C1a has a terminal connected to the terminal C of the antenna coil L1/2 and a terminal connected to the terminal A of the antenna circuit via the filter FLTa. The capacitor C2a has a terminal connected to the terminal C of the antenna coil and a terminal connected to the ground GND. The signal SX1, here non-symmetrical, is applied to the terminal A by the switch CSWa that receives at its inputs one of the combinations of states {0, HZ} {HZ, 0}, {0, 1}, {HZ, 1}, {0, "bursts of the carrier CF0"} or {HZ, "bursts of the carrier CF0"}. The antenna circuit ACT' is equivalent to the symmetrical antenna circuit ACT and its equivalent diagram when the control signal is in the state 0 or HZ is also shown by FIGS. 3A, 3B. The alternating voltage Vcd appears here between the terminals C and D of the antenna coil L1/2.

FIGS. 5A, 5B and 5C represent examples of embodiments APS1, APS2 and APS3 of the auxiliary supply circuit APS.

The circuit APS1 represented in FIG. 5A comprises a PN junction diode D1 the anode of which (input terminal of the current in the forward direction of the diode) is linked to the terminal C of the antenna coil and receives the voltage Vcd. The cathode of the diode D1 supplies the auxiliary voltage Vccr (rectified voltage) and is linked to the ground through a smoothing capacitor Cs and a Zener diode Z1 reverse mounted in parallel with the capacitor Cs. The diode Z1 stabilizes the voltage Vccr in the vicinity of its reverse breakdown voltage, such as 5V for example.

In one embodiment not represented in the Figures, the circuit APS is linked to the antenna coil L1 through an isolating switch, such as a relay of NO type (normally off) for example that is open when the reader is in the active mode so as to disconnect the circuit APS from the antenna coil L1.

In the circuit APS2 represented in FIG. 5B, instead of supplying the voltage Vccr, the cathode of the diode D1 is connected to the input INR of a voltage regulator stage comprising the diode Z1, a resistor Rb and a bipolar transistor Tb. The input INR is linked to the anode of the resistor Rb and to the collector of the transistor Tb. The cathode of the resistor Rb is linked to the base of the transistor Tb and is also linked to the ground through the reverse-mounted diode Z1. The collector of the transistor Tb forms the output OUTR of the regulator stage and supplies the voltage Vccr.

In applications in which the voltage Vcd has significant amplitude variations according to the communication distance, it will prove to be advantageous to use a circuit APS having an input stage that does not clip the voltage Vcd. A regulator without clipping diode available in stores under the reference 7805 will be used for example, such regulator supplying the voltage Vccr irrespective of the peak value of the voltage Vcd.

The circuit APS3 represented in FIG. 5C is identical to the circuit APS1 in FIG. 5A, but the anode of the diode D1 is connected to an intermediary terminal E of the antenna coil L1, forming a dividing node of the voltage Vcd that is arranged between the terminal C and the midpoint MP of the coil L1. To this end, the antenna coil L1 comprises for example three coils L11, L12 and L13 in series, the node E being the crossing point of the coils L11 and L12, the midpoint MP of the coil being the crossing point of the coils L12 and L13. The coils L11, L12 can have different impedances according to the voltage Vcd dividing rate required. The sum of the impedances of the coils L11 to L13 is equal to the impedance desired for the antenna coil L1. Assuming the impedance of the coil L11 is equal to that of the coil L12 and equal to half the impedance of the coil L13, the node E supplies a voltage Vcd' equal to Vcd/2.

Figure 6:
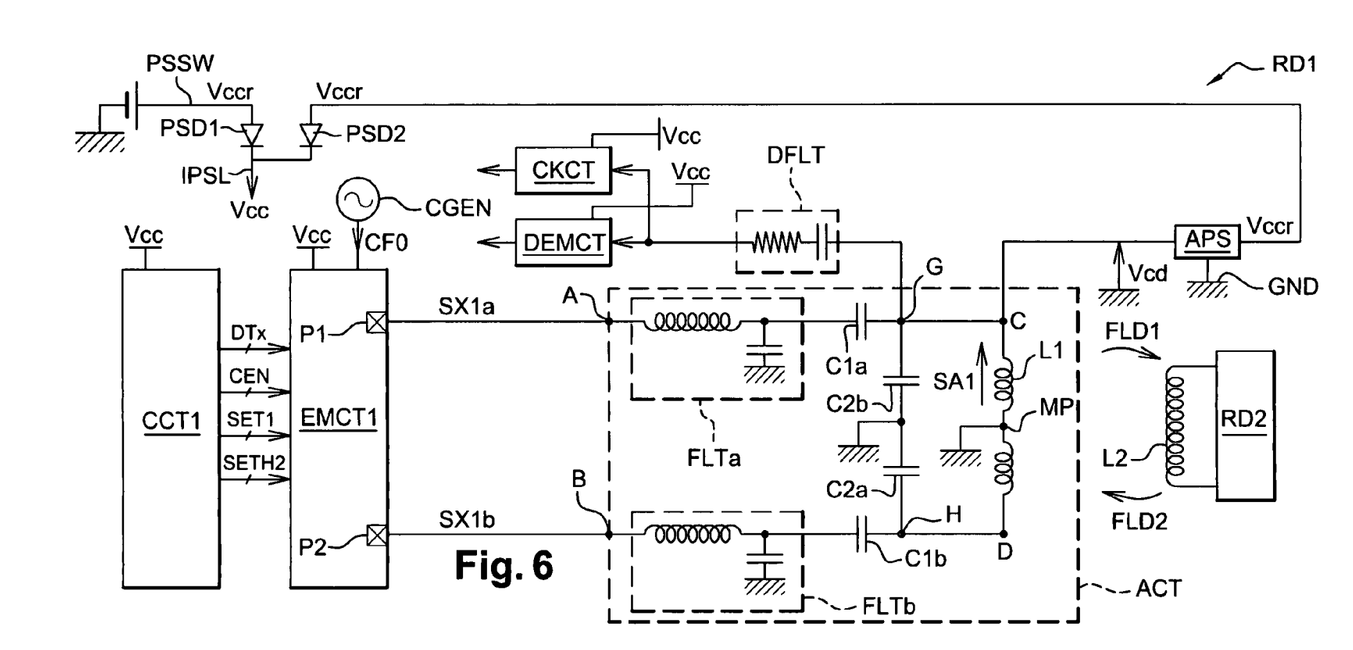
FIG. 6 represents the general architecture of an inductive coupling reader according to the present invention.

FIG. 6 is an overview of the reader RD1 according to the present invention and also represents the reader RD2 with which the reader RD1 is capable of exchanging data. The reader RD1 comprises:

a control circuit CCT1, for example a microprocessor or microcontroller equipped with peripheral circuits and particularly a program memory and a data memory (not represented), the antenna circuit ACT already described, a classical demodulation circuit DEMCT and a classical clock extraction circuit CKCT linked to the antenna circuit through a band-pass filter DFLT, the references already used to designate these elements being maintained, an emitter circuit EMCT1 according to the present invention, comprising ports P1 and P2 respectively linked to the terminals A and B of the antenna circuit ACT, an oscillator CGEN supplying the carrier CF0 of frequency F0 to the circuit EMCT1, a main power supply source MPS, such as a battery for example, supplying an external supply voltage Vcce, and the auxiliary supply circuit APS already described, connected to the terminal C of the antenna coil L1 and supplying the auxiliary supply voltage Vccr.

According to one aspect of the present invention, the external supply voltage Vcce and the auxiliary supply voltage Vccr are sent in a common power supply line IPSL that supplies the voltage Vcc powering all of the elements of the reader RD1. More particularly, the voltage Vcce is applied to the line IPSL through a forward-biased diode PSD1 and the voltage Vccr is applied to the line IPSL through a forward-biased diode PSD2. In passive mode, when the magnetic field FLD1 generated by the reader RD2 causes the voltage Vccr to appear and when the latter becomes higher than the voltage Vcce, the diode PSD1 is blocked and the reader is powered by the voltage Vccr (Vcc=Vccr). In active mode, the reader is powered by the voltage Vcce (Vcc=Vcce).

According to another aspect of the present invention, the emitter circuit EMCT1 supplies the control signal SX1 both in the active mode and in the passive mode, through the ports P1, P2. The latter are thus connected directly to the terminals A, B of the antenna circuit, without any switch of the type represented in FIGS. 2A to 2C being needed.

Thus, when the reader RD1 is in the active mode, the signal SX1 (here comprising two symmetrical components SX1a, SX1b) is an excitation signal comprising the carrier CF0 and which is amplitude modulated when data DTx must be sent.

When the reader RD1 is in the passive mode, the signal SX1 has a default state and a state whereby a load modulation can be simulated. As described above, the default state is preferably the 0 potential or the HZ potential, and the state for the load modulation simulation is to be chosen from the states 0, 1 (Vcc), HZ and "carrier bursts".

Figure 7:
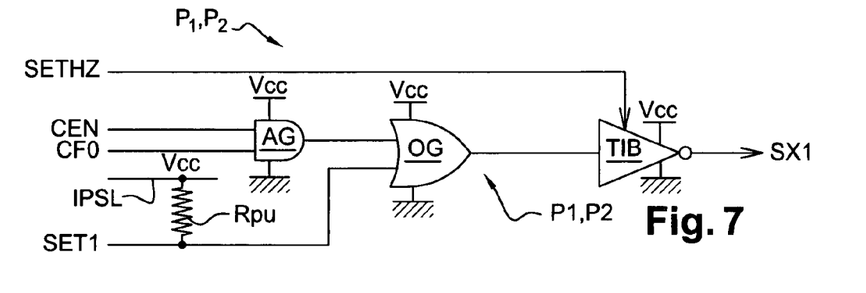
FIG. 7 represents the structure of a port of an emitter circuit present in the reader in FIG. 6, FIGS. 8A, 8B, 8C represent signals appearing in the reader in FIG. 6 when the latter sends data in passive mode.

FIG. 7 represents an example of an embodiment of the ports P1, P2 of the emitter circuit EMCT1. The port P1, P2 represented receives the carrier CF0 with or without phase shift (depending on the port considered) and is driven by a combination of control signals SETHZ ("Set High-Z"), CEN ("Carrier Enable"), SET1 ("Set to 1"). The port P1, P2 represented comprises an AND-type gate AG with two inputs, an OR-type gate OG with two inputs and a tri-state inverting buffer TIB. The gate AG receives the carrier CF0 and the signal CEN. The gate OG receives the output signal of the gate AG and the signal SET1. The output signal of the gate OG is applied to the buffer TIB that receives the signal SETHZ at a control input, the output of the buffer TIB supplying the control signal SX1 (or one of the components SX1a, SX1b).

Table 1 below describes the combinations of control signals that the circuit CCT1 can apply to the circuit EMCT1 when the reader RD1 is in the active mode, so that the circuit EMCT1 supplies the carrier (SX1=F0) or the state 0 (ground), this state corresponding to a 100% modulation of the amplitude of the antenna signal SA1 (sending data in active mode).

It will be noted here that an amplitude modulation below 100%, such as a 10% amplitude modulation for example as provided for by ISO standard 14443/B, can also be obtained by applying the finding described by European patent EP 1163718. In this case, several ports of the type represented in FIG. 7, such as six ports for example, are provided. Three ports are connected in parallel to the terminal A of the antenna circuit and three other ports are connected in parallel to the terminal B of the antenna circuit. The ports are individually driven by different combinations of control signals. To modulate the amplitude of the antenna signal SA1 with a modulation amplitude below 100%, certain ports are taken into the state HZ while others supply the carrier CF0.

Table 2 below describes the combinations of control signals that the circuit CCT1 can apply to the circuit EMCT1 when the reader RD1 is in the passive mode, to apply one of the states 0, 1 (Vcc), HZ or "bursts of the carrier C0".

Except when the "carrier bursts" state is used to simulate a load modulation, the oscillator CGEN is in principle switched off so as to limit the electrical consumption of the reader.

TABLE 1

Control signals of the circuit EMCT1 (active mode)

| No. | F0 | CEN | SET1 | SETHZ | SX1 |
|-----|----|----|------|-------|-----|
| 1 | F0 | 0 | 0 | 0 | 0 |
| 2 | F0 | 0 | 0 | 1 | HZ |
| 3 | F0 | 0 | 1 | 0 | 1 |
| 4 | F0 | 0 | 1 | 1 | HZ (redundant with 2) |
| 5 | F0 | 1 | 0 | 0 | F0 |
| 6 | F0 | 1 | 0 | 1 | HZ (redundant with 2 and 4) |
| 7 | F0 | 1 | 1 | 0 | (not used) |
| 8 | F0 | 1 | 1 | 1 | (not used) |

TABLE 2

Control signals of the circuit EMCT1 (passive mode)

| No. | F0 | CEN | SET1 | SETHZ | SX1 |
|-----|----|----|------|-------|-----|
| 1 | — | 0 | 0 | 0 | 0 |
| 2 | — | 0 | 0 | 1 | HZ |
| 3 | — | 0 | 1 | 0 | 1 |
| 4 | — | 0 | 1 | 1 | HZ (redundant with 2) |
| 5 | — | 1 | 0 | 0 | (not used) |
| 6 | — | 1 | 0 | 1 | (not used) |
| 7 | — | 1 | 1 | 0 | (not used) |
| 8 | — | 1 | 1 | 1 | (not used) |

According to yet another aspect of the present invention, the input of the gate OG receiving the signal SET1 (FIG. 7) is linked to the line IPSL via a pull-up resistor Rpu. Thus, if the reader RD1 is switched off by opening a switch PSSW arranged between the source MPS and the internal power supply line IPSL (FIG. 6), the reader can nonetheless activate itself automatically in the presence of the magnetic field FLD2 emitted by the other reader RD2. In this case, the voltage Vcc=Vccr appears on the line IPSL and the output of the gate OG is forced to 1. As a consequence, the signal SX1 at the output of the buffer changes by default to 0, such that the antenna circuit ACT is in the best configuration for receiving the electrical energy by inductive coupling, until the control circuit CCT1, after executing initialisation phases, takes control of the ports P1, P2. It shall be noted that a similar measure can be provided for forcing the signal SETHZ to 1, if the best default state for receiving the energy is the state HZ.

As an illustration of the foregoing description, FIGS. 8A, 8B, 8C, 9A, 9B, 9C represent signals appearing in the reader RD1 and in the reader RD2 when the reader RD1 in passive mode sends data to the reader RD2 in active mode. These Figures are divided into three parts EX1, EX2, EX3 each showing an example of data transmission in passive mode according to one of the six combinations of states described above.

Figure 8A:
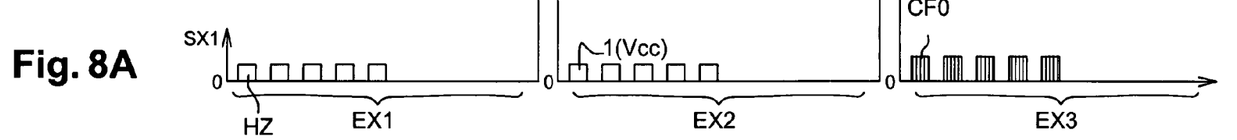
Figure 8B:
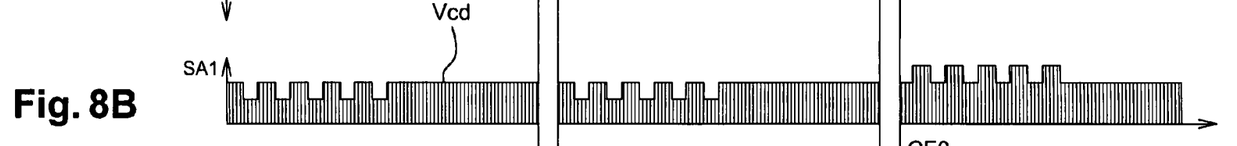
Figure 8C:
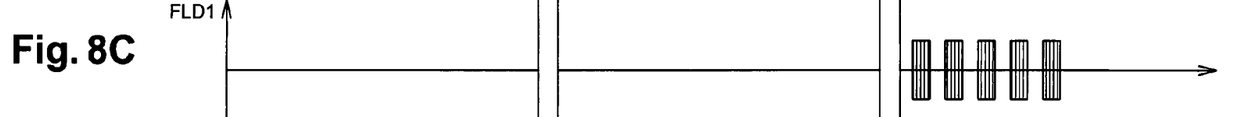
Figure 9A:
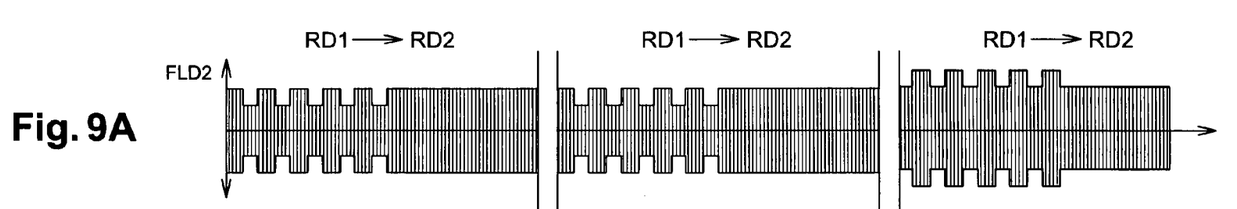
FIGS. 9A, 9B, 9C represent signals appearing in a reader in active mode linked to the reader in FIG. 6 by inductive coupling.
Figure 9B:
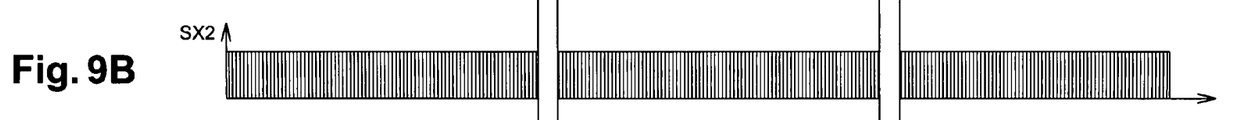
Figure 9C:
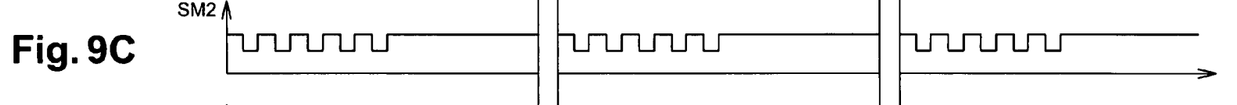

FIG. 8A represents the control signal SX1 applied to the antenna circuit ACT of the reader RD1. FIG. 8B represents the antenna signal SA1 of the reader RD1. FIG. 8C represents the magnetic field FLD1 emitted by the reader RD1. FIG. 9A represents the magnetic field FLD2 emitted by the reader RD2. FIG. 9B represents a control signal SX2 that the reader RD2 applies to its antenna circuit (although not detailed in FIG. 6, the structure of the reader RD2 is here considered to be identical to that of the reader RD1). FIG. 9C represents the load modulation signal SM2 that the reader RD2 extracts from its antenna circuit.

In the example "EX1", the default state of the signal SX1 is 0 and the state of the signal SX1 for the load modulation simulation is HZ. In the example "EX2", the default state of the signal SX1 is 0, the state of the signal SX1 for the load modulation simulation is 1 (Vcc). In the example EX3, the default state of the signal SX1 is 0, the state of the signal SX1 for the load modulation simulation is the "bursts of the carrier CF0" state.

It emerges from these figures that the excitation signal SX2 applied to the antenna circuit of the reader RD2 oscillates at the working frequency F0 but has a constant amplitude (FIG. 9B) since the reader RD2 does not send any data. However, the signal SX1 that the reader RD1 applies to its antenna circuit (FIG. 8A) has state changes (simulation of a load modulation) which cause a modulation of the envelope of the magnetic field FLD2 emitted by the reader RD2 (FIG. 9A). This envelope modulation is detected by the reader RD2 because it forms the modulation signal SM2 (FIG. 9C) that the reader RD2 extracts from its antenna circuit to deduce therefrom the data that the reader RD1 sends to it. Moreover, the antenna signal SA1 of the reader RD1 (FIG. 8B) copies the magnetic field FLD2 by inductive coupling, which enables the reader RD1 to receive the auxiliary supply voltage Vccr. In the same way as the magnetic field FLD2, the antenna signal SA1 is modulated by the state changes of the signal SX1. However, the amplitude of the signal SA1 (which forms the voltage Vcd used to produce the voltage Vccr) is only slightly affected by the changes in state of the signal SX1 such that the supply of the voltage Vccr is not interrupted during the periods of load modulation simulation. Example 3 (part EX3 of the Figures) in which the reader sends bursts of the carrier CF0, is the only case in which the magnetic field FLD1 emitted by the reader RD1 is not zero (FIG. 8C, EX3). The carrier bursts have been represented as being added to the antenna signal SA1 but these bursts can also cancel the antenna signal SA1 when the magnetic fields FLD1 and FLD2 are in opposite phase. In this case, and as indicated above, the smoothing capacitor Cs of the auxiliary supply circuit (FIGS. 5A, 5B, 5C) must have sufficient capacity to supply the voltage Vccr while the bursts of the carrier are being sent.

It will be understood by those skilled in the art that various alternative embodiments of the inductive coupling reader according to the present invention are possible. In particular, although the examples of embodiments of the circuit APS described are of non-symmetrical type and take off electrical energy between one of the two points C, D and the ground, the circuit APS can also be of symmetrical structure with midpoint referenced to the ground and be linked to the two terminals C, D of the antenna coil L1.

Those skilled in the art will also note that the presence of the low-pass circuits FLTa, FLTb in the antenna circuit can have an influence on the choice of the point used for taking off the energy in the antenna circuit. Thus, in FIG. 6, the references G and H designate two other points or nodes of the antenna circuit. The point G is situated between the filter FLTa and the capacitor C1a and would correspond to an input terminal of the antenna circuit if the latter did not have the filter FLTa. The point H is located between the filter FLTb and the capacitor C1b and would correspond to the other input terminal of the antenna circuit if the latter did not have the filter FLTb. Additional studies that those skilled in the art could take further show that each of the points G, H can also be used as points for taking off the energy, particularly when the inputs A, B of the antenna circuit are taken to high impedance (default state) since the presence of the low-pass filters increases the impedance of the antenna circuit seen from these points G, H.

Generally speaking, the higher impedance point according to the present invention is not necessarily the point at which the antenna circuit has the highest impedance. The higher impedance point is a point distinct from the input terminals A, B of the antenna circuit providing a higher impedance than the impedance offered by the input terminals A, B when the default state (0 or HZ) is applied thereto. As a numerical example, if the impedance of an antenna circuit seen from the input terminals A, B is in the order of 10Ω, the impedance of the same antenna circuit seen from the terminals C, D of the coil will be in the order of 1 KΩ and the impedance of the same antenna circuit seen from the aforementioned intermediary points G, H will be in the order of 100Ω. Thus, although the terminals C, D (or the terminal E, as voltage dividing point) form the best points for taking off the electrical energy, the energy could also be taken off at the points G, H which offer an impedance greater than the 10Ω present on the terminals A, B.

The invention claimed is:

1. A method for supplying a power supply voltage to a contactless integrated circuit reader that is in a passive operating mode, in the presence of an external alternating magnetic field, the reader comprising an antenna circuit having at least one input terminal, at least one capacitor and an antenna coil having two end terminals, the antenna circuit being substantially tuned to a working frequency and having, as measured with respect to the at least one input terminal and at the working frequency, a first impedance, the method comprising:
taking off in the antenna circuit an alternating voltage induced in the antenna circuit by the external magnetic field; and
rectifying the alternating voltage to supply an auxiliary supply voltage of the reader.

2. The method according to claim 1, further comprising:
applying to the input terminal of the antenna circuit a control signal having an electric potential by default such that the antenna circuit has a higher impedance point at which its impedance is higher than the first impedance; and
taking off the alternating voltage at the higher impedance point without going through the input terminal.

3. The method according to claim 2, wherein the alternating voltage is taken off on at least one terminal of the antenna coil.

4. The method according to claim 2, wherein the alternating voltage is rectified without clipping the induced alternating voltage.

5. The method according to claim 2, wherein the alternating voltage is taken off on one of the end terminals of the coil.

6. The method according to claim 2, wherein the alternating voltage is taken off on one terminal of the antenna coil that is not at the end of the coil and which forms a dividing point of the induced alternating voltage.

7. The method according to claim 2, wherein the auxiliary supply voltage is supplied during a data receiving phase of the reader in passive operating mode.

8. The method according to claim 7, wherein the auxiliary supply voltage is also supplied during a data sending phase of the reader in passive operating mode.

9. The method according to claim 2, wherein the reader further comprises an internal power supply line coupled to a main power supply source supplying a main supply voltage, and the method further comprises:
injecting the auxiliary supply voltage into the internal supply line and blocking the main supply voltage when the auxiliary supply voltage is injected into the internal supply line.

10. The method according to claim 2, wherein the default electric potential of the control signal is one of:
a high impedance potential; and
a 0 potential, corresponding to the ground potential of the reader.

11. The method according to claim 2, further comprising:
switching the control signal into a second electric potential in addition to the default electric potential, so as to cause a modification to the impedance of the antenna circuit, to cause a load modulation in the antenna coil of another reader and to send data in the passive mode using the antenna circuit.

12. The method according to claim 11, wherein the control signal in passive mode has one of the following combinations of states:
1) by default, a 0 potential, and a high impedance potential to simulate a load modulation;
2) by default, the high impedance potential, and the 0 potential to simulate a load modulation;
3) by default, the 0 potential, and a direct voltage to simulate a load modulation;
4) by default, the high impedance potential, and a direct voltage to simulate a load modulation;
5) by default, the 0 potential, and an oscillating electric signal to simulate a load modulation;
6) by default, the high impedance potential and an oscillating electric signal to simulate a load modulation.

13. An inductive coupling reader having an active operating mode and a passive operating mode, the inductive coupling reader comprising:
an antenna circuit substantially tuned to a working frequency, the antenna circuit having at least one input terminal, at least one capacitor, and an antenna coil having two end terminals, the capacitor and the coil being chosen so that the antenna circuit is substantially tuned to the working frequency and has, at the working frequency and as measured with respect to the at least one input terminal, a first impedance;
an emitter circuit that applies to the input terminal of the antenna circuit, when the reader is in the active operating mode, an excitation signal oscillating at the working frequency, so that the antenna coil emits a magnetic field, and that modulates the excitation signal to send data; and
an auxiliary supply circuit coupled to the antenna circuit and configured to supply an auxiliary supply voltage of the reader using an alternating voltage induced in the antenna circuit by an external magnetic field.

14. The reader according to claim 13, comprising a circuit for applying to the input terminal of the antenna circuit, in the passive operating mode, a control signal having an electric potential by default such that the antenna circuit has a higher impedance point at which its impedance is higher than the first impedance, and wherein the auxiliary supply circuit is coupled to the higher impedance point without going through the input terminal of the antenna circuit.

15. The reader according to claim 14, wherein the auxiliary supply circuit is coupled to at least one terminal of the antenna coil.

16. The reader according to claim 14, wherein the auxiliary supply circuit comprises an input stage without a clipper diode for clipping the induced alternating voltage.

17. The reader according to claim 14, wherein the auxiliary supply circuit is connected to one of the end terminals of the coil.

18. The reader according to claim 14, wherein the auxiliary supply circuit is connected to one terminal of the coil that is not at the end of the coil and which forms a dividing point of the induced alternating voltage.

19. The reader according to claim 14, wherein the auxiliary supply circuit comprises at least one rectifying diode that rectifies the alternating voltage and a capacitor that low-pass filters the rectified voltage.

20. The reader according to claim 14, wherein the auxiliary supply circuit supplies the auxiliary supply voltage during a phase of receiving data in passive operating mode.

21. The reader according to claim 20, wherein the auxiliary supply circuit also supplies the auxiliary supply voltage during a phase of sending data in passive operating mode.

22. The reader according to claim 14, comprising an internal power supply line coupled firstly to a main power supply source and secondly to the auxiliary supply circuit.

23. The reader according to claim 22, wherein the internal supply line is coupled to the main supply source and to the auxiliary supply circuit through a circuit that blocks a voltage proceeding from the main supply source when the auxiliary supply voltage is present.

24. The reader according to claim 14, wherein the default electric potential of the control signal is one of:
a high impedance potential; and
a 0 potential, corresponding to the ground potential of the reader.

25. The reader according to claim 14, comprising a circuit for taking the control signal into a second electric potential in addition to the default electric potential, in order to cause a modification to the impedance of the antenna circuit at the working frequency and to send data in passive operating mode.

26. The reader according to claim 25, wherein the control signal in passive mode has one of the following combinations of states:
1) by default, a 0 potential, and a high impedance potential to simulate a load modulation;
2) by default, the high impedance potential, and the 0 potential to simulate a load modulation;
3) by default, the 0 potential, and a direct voltage to simulate a load modulation;
4) by default, the high impedance potential, and a direct voltage to simulate a load modulation;
5) by default, the 0 potential, and an oscillating electric signal to simulate a load modulation; and
6) by default, the high impedance potential and an oscillating electric signal to simulate a load modulation.

27. The reader according to claim 14, wherein the emitter circuit supplies the control signal applied to the input terminal of the antenna circuit in the passive operating mode.

28. The reader according to claim 14, wherein the control signal is taken to the second electric potential by the emitter circuit.

29. A portable electronic device comprising:
a processor;
a rechargeable battery coupled to the processor; and
an inductive coupling reader having an active operating mode and a passive operating mode, the inductive coupling reader being coupled to the processor, the inductive coupling reader including:
an antenna circuit substantially tuned to a working frequency, the antenna circuit having at least one input terminal, at least one capacitor, and an antenna coil having two end terminals, the capacitor and the coil being chosen so that the antenna circuit is substantially tuned to the working frequency and has, at the working frequency and as measured with respect to the at least one input terminal, a first impedance;
an emitter circuit that applies to the input terminal of the antenna circuit, when the reader is in the active operating mode, an excitation signal oscillating at the working frequency, so that the antenna coil emits a magnetic field, and that modulates the excitation signal to send data; and
an auxiliary supply circuit coupled to the antenna circuit and configured to supply an auxiliary supply voltage of the reader using an alternating voltage induced in the antenna circuit by an external magnetic field.

30. The portable electronic device according to claim 29, wherein the reader in the active operating mode is powered by the battery of the portable device, and is self-powered by the auxiliary supply circuit in the passive operating mode.

* * * * *

UNITED STATES PATENT AND TRADEMARK OFFICE
CERTIFICATE OF CORRECTION

PATENT NO. : 7,665,664 B2
APPLICATION NO. : 11/302291
DATED : February 23, 2010
INVENTOR(S) : Charrat et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1106 days.

Signed and Sealed this

Seventh Day of December, 2010

David J. Kappos
*Director of the United States Patent and Trademark Office*

UNITED STATES PATENT AND TRADEMARK OFFICE
Certificate

Patent No. 7,665,664 B2

Patented: February 23, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Bruno Charrat, Aix en Provence (FR); Michel Martin, Rognes (FR); and Olivier Carron, Roquevaire (FR).

Signed and Sealed this Nineteenth Day of November 2013.

STEVEN S. PAIK
*Supervisory Patent Examiner*
Art Unit 2887
Technology Center 2800